(12) United States Patent
Sorg et al.

(10) Patent No.: US 9,171,287 B2
(45) Date of Patent: Oct. 27, 2015

(54) ORDERING OF BOOKMARKS FOR OBJECTS IN A SOCIAL NETWORKING SYSTEM

(71) Applicant: Facebook, Inc., Menlo Park, CA (US)

(72) Inventors: Jonathan Sorg, San Francisco, CA (US); Ken Deeter, San Francisco, CA (US); Thomas Stocky, Los Altos, CA (US); Robyn David Morris, San Francisco, CA (US)

(73) Assignee: Facebook, Inc., Menlo Park ( * ) Notice: Subject to any disclaimer, the term of this patent is extended or adjusted under 35 U.S.C. 154(b) by 369 days.

(21) Appl. No.: 13/720,724

(22) Filed: Dec. 19, 2012

(65) Prior Publication Data

US 2014/0173399 A1    Jun. 19, 2014

(51) Int. Cl.
  G06F 17/22    (2006.01)
  G06Q 10/10    (2012.01)
  G06Q 50/00    (2012.01)
  G06F 17/30    (2006.01)

(52) U.S. Cl.
  CPC .......... *G06Q 10/10* (2013.01); *G06F 17/30884* (2013.01); *G06Q 50/01* (2013.01)

(58) Field of Classification Search
  CPC ................................................. G06F 17/2241
  USPC ......................................................... 715/206
  See application file for complete search history.

(56) References Cited

U.S. PATENT DOCUMENTS 7,899,829 B1 * 3/2011 Malla ............................ 707/741
8,918,404 B1 * 12/2014 Dachille ...................... 707/748
2002/0103933 A1 * 8/2002 Garon et al. .................. 709/246
2005/0159970 A1 * 7/2005 Buyukkokten et al. ........... 705/1
2008/0010252 A1 * 1/2008 Zamir et al. ...................... 707/3
2008/0040474 A1 * 2/2008 Zuckerberg et al. .......... 709/224
2008/0086471 A1 * 4/2008 Ritter et al. ....................... 707/8
2009/0070700 A1 * 3/2009 Johanson ....................... 715/776
2009/0210806 A1 * 8/2009 Dodson et al. ................ 715/760
2009/0222716 A1 * 9/2009 Boerries et al. ............... 715/206
2010/0042648 A1 * 2/2010 Cannon et al. ............. 707/104.1
2010/0153371 A1 * 6/2010 Singh ............................ 707/722
2010/0318701 A1 * 12/2010 Srinivasan et al. ............ 710/104

(Continued)

FOREIGN PATENT DOCUMENTS

WO      WO 99/62008    * 12/1999    .............. G06F 17/30

OTHER PUBLICATIONS

Guy, Ido, Naama Zwerdling, Inbal Ronen, David Carmel, and Erel Uziel. "Social media recommendation based on people and tags." In Proceedings of the 33rd international ACM SIGIR conference on Research and development in information retrieval, pp. 194-201. ACM, 2010.*

(Continued)

*Primary Examiner* — Frank D Mills
(74) *Attorney, Agent, or Firm* — Fenwick & West LLP

(57) ABSTRACT

A social networking system analyzes a user's interactions with objects linked to bookmarks associated with the user to generate a score for each bookmark. The score represents or is based on the probability that the user will access the bookmark or the linked object. For example, the score is a predicted click-through rate for the bookmark. Based on the scores, a subset of the bookmarks is selected for presentation to the user. Additionally, the scores may be used to order the selected subset of the bookmarks. Hence, the bookmarks that the user is most likely to access are presented while the bookmarks the user is less likely to access may be hidden.

24 Claims, 3 Drawing Sheets

(56) References Cited

U.S. PATENT DOCUMENTS

| | | | |
|---|---|---|---|
| 2011/0022602 A1* | 1/2011 | Luo et al. | 707/748 |
| 2011/0218946 A1* | 9/2011 | Stern et al. | 706/12 |
| 2011/0258216 A1* | 10/2011 | Supakkul et al. | 707/769 |
| 2011/0320380 A1* | 12/2011 | Zahn et al. | 705/347 |
| 2011/0320430 A1* | 12/2011 | Coupe | 707/711 |
| 2012/0001919 A1* | 1/2012 | Lumer | 345/440 |
| 2012/0030152 A1* | 2/2012 | Pueyo et al. | 706/12 |
| 2012/0260192 A1* | 10/2012 | Detweiler | 715/745 |
| 2013/0036344 A1* | 2/2013 | Ahmed et al. | 715/205 |
| 2013/0041876 A1* | 2/2013 | Dow et al. | 707/706 |
| 2013/0086057 A1* | 4/2013 | Harrington et al. | 707/732 |
| 2013/0086078 A1* | 4/2013 | Malleshaiah | 707/748 |
| 2013/0097180 A1* | 4/2013 | Tseng | 707/748 |
| 2013/0103758 A1* | 4/2013 | Alison et al. | 709/204 |
| 2013/0159314 A1* | 6/2013 | Kao et al. | 707/740 |
| 2013/0212479 A1* | 8/2013 | Willis et al. | 715/736 |
| 2013/0290110 A1* | 10/2013 | LuVogt et al. | 705/14.66 |
| 2014/0059029 A1* | 2/2014 | Magill et al. | 707/706 |
| 2014/0108968 A1* | 4/2014 | Vishria | 715/760 |

OTHER PUBLICATIONS

Chen, Feilong, Jerry Scripps, and Pang-Ning Tan. "Link mining for a social bookmarking web site." In Web Intelligence and Intelligent Agent Technology, 2008. WI-IAT'08. IEEE/WIC/ACM International Conference on, vol. 1, pp. 169-175. IEEE, 2008.*

* cited by examiner

ORDERING OF BOOKMARKS FOR OBJECTS IN A SOCIAL NETWORKING SYSTEM

CROSS-REFERENCE TO RELATED APPLICATION

This application is related to U.S. patent application Ser. No. 13/330,474, filed on Dec. 19, 2011, which is incorporated by reference herein in its entirety.

BACKGROUND

This invention relates generally to displaying bookmarks in a social networking system, and in particular to ordering the displayed bookmarks.

Social networking systems typically maintain a social graph including many objects to which its users may connect. Examples of objects include interactive applications, groups of users, or brand pages. To allow a user to more easily access objects to which the user is connected, the social networking system may provide bookmarks that link to the objects as part of a user interface displayed to the user.

However, as a user becomes connected to an increasing number of objects, the number of bookmarks displayed to the user can become overwhelming. This makes it be time-consuming and frustrating for a user to find a particular bookmark from a large number of displayed bookmarks.

SUMMARY

To avoid displaying an overwhelming number of bookmarks to the user, a social networking system analyzes user interactions with objects in the social networking system to modify presentation of bookmarks to the user. For example, the user's interactions with social networking system objects are used to generate a score for each bookmark, where the score represents or is based at least in part on the probability that the user will access the bookmark or the object linked to the bookmark. Based on these scores, a subset of bookmarks is selected for presentation to the user. The scores may also be used to determine an order in which the bookmarks are presented to the user. Thus, the social networking system may display the bookmarks that the user is more likely to access while hiding the bookmarks that the user is less likely to access.

In one embodiment, each score is a predicted click-through rate for the corresponding bookmark. The predicted click-through rate may be modified determined based on actual click-through rates to more accurately select and/or order bookmarks. Various types of data may be used to generate the scores. Examples of data for generating the scores include user's interactions with the objects, affinity values between the user and the objects, connections shared between the user and the objects, and notifications from the objects.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1A:
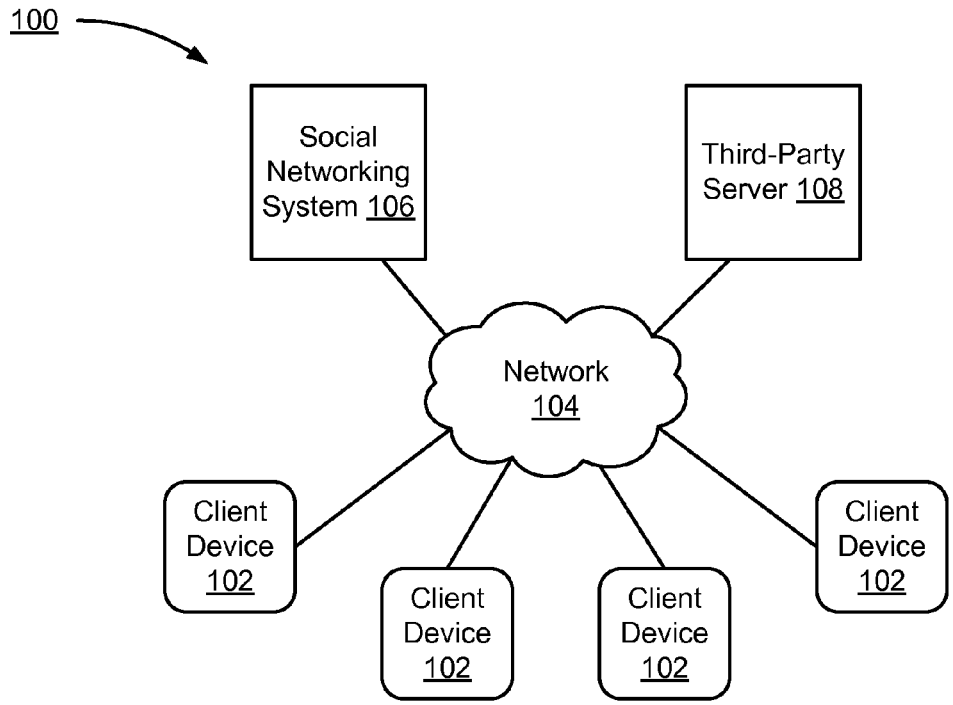
FIG. 1A is a block diagram illustrating a system environment for a social networking system, according to one embodiment.

FIG. 1A is a block diagram of one embodiment of a system environment 100 for a social networking system 106. The system environment 100 comprises one or more client devices 102, a network 104, the social networking system 106, and one or more third-party severs 108. In alternative configurations, different and/or additional components may be included in the system environment 100. The embodiments described herein can also be adapted to online systems that are not social networking systems.

The client devices 102 comprise one or more computing devices capable of receiving user input as well as transmitting and/or receiving data via the network 104. In one embodiment, a client device 102 is a conventional computer system, such as a desktop or laptop computer. In another embodiment, a client device 102 may be a device having computer functionality, such as a personal digital assistant (PDA), mobile telephone, smart-phone or similar device. A client device 102 is configured to communicate via the network 104. In one embodiment, a client device 102 executes an application allowing a user of the client device 102 to interact with the social networking system 106. For example, a client device 102 executes a browser application to enable interaction between the client device 102 and the social networking system 106 via the network 104. In another embodiment, a client device 102 interacts with the social networking system 106 through an application programming interface (API) that runs on the native operating system of the client device 102, such as IOS® or ANDROID™.

A social networking system user may use several different client devices 102 to interact with the social networking system 106. For example, a user may use a desktop computer to interact with the social networking system 106 at home and a smart-phone to interact with the social networking system while traveling. In addition, multiple users may use the same client device 102 to interact with the social networking system 106.

The client devices 102 are configured to communicate via the network 104, which may comprise any combination of local area and/or wide area networks, using both wired and wireless communication systems. In one embodiment, the network 104 uses standard communications technologies and/or protocols. Thus, the network 104 may include communication links using technologies such as Ethernet, 802.11, worldwide interoperability for microwave access (WiMAX), 3G, 4G, CDMA, digital subscriber line (DSL), etc. Similarly, the networking protocols used on the network 104 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network 104 may be represented using technologies and/or formats including hypertext markup language (HTML) or extensible markup language (XML). In addition, all or some of the communication links can be encrypted using conventional encryption technologies such as secure sockets layer (SSL), transport layer security (TLS), and Internet Protocol security (IPsec). The third party server 108 may be coupled to the network 104 for communicating with the social networking system 106, which is further described below in conjunction with FIG. 1B.

Figure 1B:
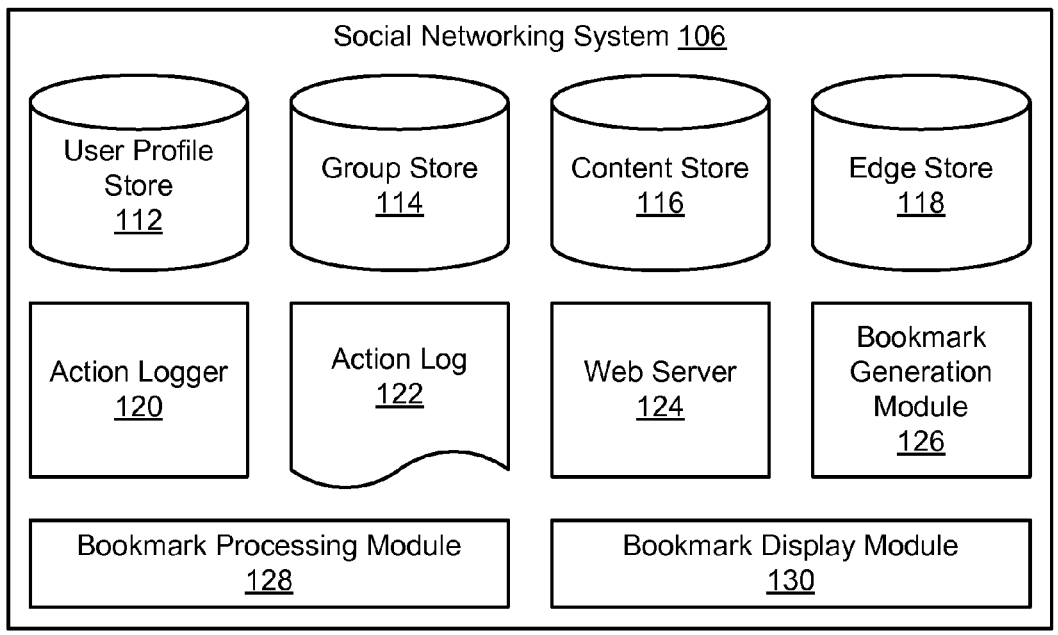
FIG. 1B is an example block diagram of an architecture of the social networking system, according to one embodiment.

FIG. 1B is one embodiment of an architecture of the social networking system 106. In the embodiment shown by FIG. 1B, the social networking system 106 includes a user profile store 112, a group store 114, a content store 116, an edge store 118, an action logger 120, an action log 122, a web server 124, a display generation module 126, a bookmark generation module 128, and a bookmark ordering module 130. In other embodiments, the social networking system 100 may include additional, fewer, or different components for various applications. Conventional components such as network interfaces, security functions, load balancers, failover servers, management and network operations consoles, and the like are not shown so as to not obscure the details of the system architecture.

Each user of the social networking system 106 is associated with a user profile, which is stored in the user profile store 112. A user profile includes declarative information about the user that was explicitly provided by the user, and may also include information inferred by the social networking system 106. In one embodiment, a user profile includes multiple data fields, with each data field describing one or more attributes of the corresponding user of the social networking system 106. Examples of information stored in a user profile includes biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 106 displayed in an image. A user profile in the user profile store 112 may also maintain references to actions by the corresponding user performed on content items in the content store 116 and stored in the action log 122 and references to connections to other users maintained by the edge store 118.

While user profiles in the user profile store 112 are frequently associated with individuals, allowing people to interact with each other via the social networking system 106, user profiles may also be stored for entities such as businesses or organizations. This allows an entity to establish a presence on the social networking system 106 for connecting and exchanging content with other social networking system users. The entity may post information about itself, about its products or provide other information to users of the social networking system 106 using a brand page associated with the entity's user profile. Other users of the social networking system 106 may connect to the brand page to receive information posted to the brand page or to receive information from the brand page. A user profile associated with the brand page may include information about the entity itself, providing users with background or informational data about the entity associated with the brand page.

A user profile may also store a user profile list that defines a list of other user profiles. The user profile list can be created and updated by the user or automatically created and updated by the social networking system 106. For example, a user creates and updates a list of user profiles belonging to the user's close friends, family members, or co-workers. In another example, the social networking system 106 automatically creates and updates a list of users that attended the same university as the user. A user profile list may be used to identify content items associated with users on the user profile list for presentation to the user, allowing the user to more easily interact with the users on the user profile list.

Users and other entities may join groups, and information about the groups is stored in the group store 114. A group includes a plurality of users having one or more common interests. Additionally, a group may be associated with a page or other communication channel where users in the group may share content related to the one or more common interests. For example, users may belong to a group about rabbits in which the users share content about caring for and playing with pet rabbits. Information about a group maintained by the group store 114 includes, a name for the group, a description of the group, and settings regulating joining the group or editing information associated with the group.

The content store 116 stores objects representing various types of content. Examples of content represented by an object include a page post, a status update, a photo, a video, a link, a shared content item, a gaming application achievement, a check-in event at a local business, a brand page, or any other type of content. Objects may be created by users of the social networking system 106, such as status updates, photos, events, groups or applications. In some embodiments, objects are received from third-party applications, which may be separate from the social networking system 106. Content "items" represent single pieces of content that are presented to social networking system users. Presenting content items to users increases user interaction with the social networking system 106 by encouraging users to post content items for presentation, increasing the interaction of users with each other and increasing the frequency with which users interact within the social networking system 106.

The edge store 118 stores information describing connections between user profiles and other objects on the social networking system 106 as edges. Some edges may be defined by users, allowing users to specify their relationships with other users by generating edges between their user profiles with the user profiles of the other users. For example, users may generate edges with other user profiles that parallel the users' real-life relationships, such as friends, co-workers, partners, and so forth. Other edges are generated when users interact with objects in the social networking system 100, such as expressing interest in a page on the social networking system 106, becoming a member of a group, sharing a link with other users of the social networking system 106, and commenting on posts made by other users of the social networking system 106.

The edge store 118 includes information describing an edge, such as affinity values for objects, groups, interests, and other user profiles. Affinity values may be computed by the social networking system 106 over time to approximate a user's affinity for an object, group, interest, and other user profiles in the social networking system 106 based on the actions performed by the user. Computation of affinity is further described in U.S. patent application Ser. No. 12/978,265, filed on Dec. 23, 2010, which is hereby incorporated by reference in its entirety. In one embodiment, multiple interactions between a user and a specific object may be stored as a single edge in the edge store 118; alternatively, each interaction is stored as a separate edge. In some embodiments, connections between user profiles may be stored in the user profile store 112, or the user profile store 112 may access the edge store 118 to determine connections between user profiles.

The action logger 120 receives communications about user actions on and/or off the social networking system 106 and populates the action log 122 with information describing these actions. Examples of actions include adding a connection to another user, sending a message to another user, uploading an image, reading a message from another user, viewing content associated with another user, attending an event posted by another user, among others.

The social networking system 106 uses the action log 122 to track user actions on the social networking system 106, as well as on external websites that communicate information to the social networking system 106. Users may interact with various objects on the social networking system 106, including commenting on posts, sharing links, and checking-in to physical locations via a mobile device, accessing content items or other interactions. Information describing these actions is stored in the action log 122. Additional examples of interactions with objects on the social networking system 106 included in the action log 122 include commenting on a photo album, communications between users, becoming a fan of a musician, adding an event to a calendar, joining a group, becoming a fan of a brand page, creating an event, authorizing an application, using an application and engaging in a transaction. Additionally, the action log 122 records a user's interactions with advertisements on the social networking system 106 as well as other applications operating on the social networking system 100. In some embodiments, each entry in the action log 122 also includes an identifier for the client device 102 that was used to perform the action. In some embodiments, data from the action log 122 is used to infer interests or preferences of the user, augmenting the interests included in the user profile and allowing a more complete understanding of user preferences.

The action log 122 may also store user actions taken on external websites. For example, an e-commerce website that primarily sells sporting equipment at bargain prices may recognize a user of a social networking system 106 through social plug-ins that enable the e-commerce website to identify the user of the social networking system 106. Because users of the social networking system 106 are uniquely identifiable, third party servers 104, such as this sporting equipment retailer, may use the information about social networking system users accessing content from a third party server 104. The action log 122 records data about these users, including webpage viewing histories, advertisements that were engaged, purchases made, and other patterns from shopping and buying.

Data maintained by the user profile store 112, the group store 114, the content store 116, the edge store 118, and the action log 122 are collectively referred to as a "social graph." At a high level, the user profiles, groups, and content items form nodes in the social graph, and edges connect the nodes. Edges between nodes may be based on connections described in the edge store 118 or actions stored in the action log 122. In some embodiments, the social graph includes additional types of nodes and edges that are not explicitly described above with reference to the user profile store 112, the group store 114, the content store 116, the edge store 118, and the action log 122.

The web server 124 links the social networking system 106 via the network 104 to the one or more client devices 102, as well as to the one or more third party servers 108. The web server 124 serves web pages, as well as other web-related content, such as JAVA®, FLASH®, XML and so forth. The web server 124 may receive and route messages between the social networking system 106 and client devices 102, for example, instant messages, queued messages (e.g., email), text and SMS (short message service) messages, or messages sent using any other suitable messaging technique. A user may send a request to the web server 124 to upload information, for example, profile information to be stored in the user profile store 112, images or videos to be stored in the content store 116, or requests to generate new edges to connect with user profiles, groups, or content items. Additionally, the web server 124 may provide API functionality to send data directly to native client device operating systems, such as IOS®, ANDROID™, WEBOS® or RIM.

The bookmark generation module 126 generates bookmarks for a user. A bookmark is data including a link to an object in the social networking system 106. The object to which a bookmark includes a link may be any node on the social graph that can be displayed to the user, such as a content item, a user profile or a group. The object to which a bookmark links may be any content presented by the social networking system 106, such as a page, an application, or a list of content items from users on a user profile list. A bookmark may also include a link to search query saved by a user, as described in U.S. patent application Ser. No. 13/748,112, filed on Jan. 23, 2013, which is incorporated by reference herein in its entirety.

The bookmark generation module 126 generates a bookmark for a user based on the user's activity. For example, the bookmark generation module 126 may automatically create and store a bookmark linking to an object when the user first interacts with the object (e.g., by joining a group or using an application for the first time). Additionally, a user may send a request to the bookmark generation module 126 identifying an object and the module 126 creates a bookmark linking to the object identified by the request. After creating a bookmark for a user, the bookmark generation module 126 stores the bookmark in the user's user profile in the user profile store 112.

The bookmark processing module 128 receives bookmarks stored in a user profile and selects a subset of the bookmarks to be presented to the user. In one embodiment, the bookmark processing module 128 also determines the order in which the selected subset of bookmarks are presented. In other embodiments, the bookmark processing module 128 determines an ordering of the bookmarks stored in a user profile without selecting a subset of bookmarks, so all of the stored bookmarks may be displayed using the determined ordering. In one embodiment, the bookmark processing module 128 selects and/or orders the bookmarks based on data in one or more of the action log 122, the edge store 118, and the user profile store 112. Selection and ordering of bookmarks is further described below in conjunction with FIG. 2.

The bookmark display module 130 receives bookmarks selected by the bookmark processing module 128, and may also receive an ordering of the selected bookmarks, and renders the bookmarks for presentation to a user. For example, the bookmark display module 130 renders the bookmarks as a vertical list for display on one side of web page. Alternatively, the bookmark display module 130 renders the bookmarks as a horizontal row of tiles, as described in U.S. patent application Ser. No. 13/748,112, filed on Jan. 23, 2013, which is incorporated by reference herein in its entirety. In one embodiment, the bookmark display module 130 also renders a user interface element for accessing stored bookmarks that were not selected for presentation by the bookmark processing module 128. For example, the bookmark display module 130 renders "more" button causing non-selected bookmarks to be displayed when accessed. The bookmark processing module 128 may also generate an ordering for the non-selected bookmarks. Although the bookmark display module 130 is shown in FIG. 1B as part of the social networking system 106, some or all of the functions of the bookmark display module 130 may alternatively be performed on a client device 102.

Determining Selection and Ordering of Bookmarks

Figure 2:
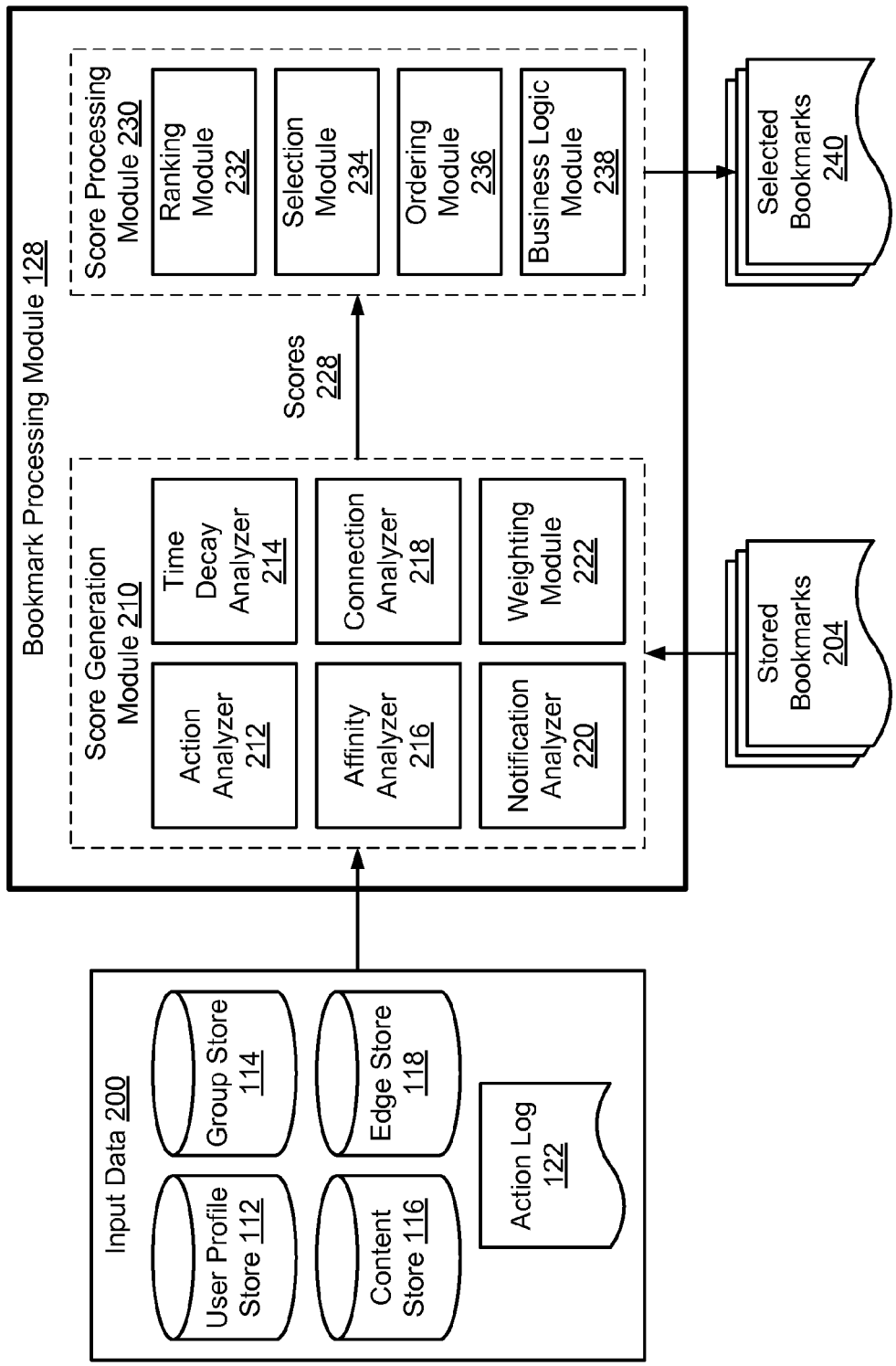
FIG. 2 is a block diagram illustrating a bookmark processing module of a social networking system, according to one embodiment.

FIG. 2 is a block diagram of one embodiment of the bookmark processing module 128. In the illustrated embodiment, the bookmark processing module 128 includes a score generation module 210 and a score processing module 230.

The score generation module 210 analyzes input data 200 from data associated with a user by the social networking system 106 to generate scores for a plurality of bookmarks 204 stored in a user profile. In one embodiment, a score represents the user's likelihood of accessing the bookmark corresponding to the score when the bookmark is presented to the user. For example, a score is a predicted click-through rate for a bookmark. In another embodiment, a score represents the user's likelihood of interacting with the object corresponding to the bookmark. For example, a score represents the likelihood that the user will pay money to an interactive application or add comments to a content item posted in a group or user profile. In some embodiments, the score generation module 228 generates multiple scores for each bookmark based on the type of object corresponding to the bookmark. For example, each bookmark receives a first score representing a predicted click-through rate for the bookmark, bookmarks linking to an application receive a second score representing a likelihood that the user will pay money to the application, and bookmarks linking to a group receive a second score representing a likelihood that the user will add comments to a content item posted in the group.

The score processing module 230 receives the scores 228 from the score generation module 210 and selects a subset of the bookmarks from the user profile based on the stores. In some embodiments, the score processing module 230 also determines an ordering of the subset of bookmarks based at least in part on the scores 228.

In the embodiment shown in FIG. 2, the score generation module 210 includes an action analyzer 212, a time decay analyzer 214, an affinity analyzer 216, a connection analyzer 218, and a notification analyzer 220, which each generate a score based on a different aspect of the input data 200. The score generation module 210 also includes a weighting module 222 that combines the scores generated by the action analyzer 212, the time decay analyzer 214, the affinity analyzer 216, the connection analyzer 218, and the notification analyzer 220 to generate one or more overall scores for each bookmark. For example, the weighting module generates a weighted sum or product of the scores for a bookmark. In other embodiments, the score generation module 210 may include additional, fewer, or different analyzers that generate scores based on different aspects of the input data 200.

The action analyzer 212 generates an action score for a bookmark based on the user's interactions with the object to which the bookmark links. The interactions may include the number of times the user has accessed the object linked to the bookmark, either by accessing the bookmark or accessing the linked object through another method (e.g., using a search tool). The action analyzer 212 may also account for the frequency of the user's interactions with the linked object (e.g., the number of interactions over a period of time), the length of a user's interactions (e.g., the length of time spent playing a game), and the type of interactions with the linked object (e.g., paying money to an application may be given greater weight than adding a comment to a content item).

The time decay analyzer 214 generates a time decay score for a bookmark based on how recently the user interacted with the object linked to the bookmark. In one embodiment, the time decay analyzer 214 associates a time decay score with a bookmark based on a length of time between the user's most recent interaction with the object and the current time. For example, a bookmark linking to an object that the user interacted with recently may have a higher time decay score than a bookmark linking to an object that the user has not interacted with for several months. In another embodiment, the time decay analyzer 214 calculates separate time decay subscores for a plurality of the user's interactions with the object linked to the bookmark and generates an overall time decay score based on the time decay subscores (e.g., by calculating a sum of the subscores). This process of calculating time decay subscores allows multiple interactions to contribute to the overall time decay score and can provide a more accurate representation of the user's current interest in the object linked to the bookmark.

The affinity analyzer 216 generates an affinity score for a bookmark based on the affinity value between the user and the object linked to the bookmark. As described above with reference to the edge store 118, an affinity value may be included in data describing an edge connecting the user to the object linked to the bookmark. In one embodiment, the affinity score is the affinity value. In another embodiment, the affinity analyzer 216 generates the affinity score by comparing the affinity value to the user's affinity values for other objects. For example, the affinity analyzer 216 may determine an average affinity of the user for multiple objects and generate affinity score for the object linked to the bookmark by dividing the user's affinity value for the object linked to the bookmark by the average affinity.

The connection analyzer 218 generates a connection score for a bookmark based on common connections between the object linked to the bookmark and the user profile of the user. For example, a bookmark for may receive a higher connection score if at least a threshold number of other users connected to the user are also connected to the object linked to the bookmark. In one embodiment, the connection analyzer 218 also adjusts the connection score based on the total number of connections to the object linked to the bookmark (e.g., the total number of members in a group or the total number of users for an application). For example, the connection analyzer 218 increases a connection score of a bookmark if at least a threshold number of users in a group including the user are connected to the object linked to the bookmark.

The notification analyzer 220 generates a notification score for a bookmark based on the number of notifications associated with the object linked to the bookmark. For an object linked to a bookmark capable of being viewed by multiple users, such as a group or a brand page, the number of notifications may be a global number of new content items associated with the object or may be a number of new content items associated with the object that have not been viewed by the user. In one embodiment, the notification score is the number of notifications. In this embodiment, bookmarks linked to objects to which content items are more frequently posted or with which content items are more frequently associated would have higher notification scores. In another embodiment, the notification score is normalized to a historical average number of notifications associated with the object linked to the bookmark, resulting in a higher notification score when an object experiences a sudden increase in activity.

In some embodiments, one or more of the analyzers 212, 214, 216, 218, 220 may also analyze data associated with additional objects having content related to content of an object linked to a bookmark when generating a score for the bookmark. For example, if a bookmark links to a group supporting the President of the United States, one or more of the analyzers 212, 214, 216, 218, 220 may analyze interactions, affinity values, connection data, and notifications associated with other groups supporting the President, a brand page for the President's re-election campaign, and a brand page for the White House. This allows the score for the bookmark to reflect global changes in interest in a certain user, person, entity, topic, or idea. For example, there is likely to be a large increase in activity (i.e., interactions, connections, and notifications) on multiple objects related to the President of the United States when the President wins re-election or announces the death of a major terrorist leader, and analyzing data for multiple objects related to the President allows the score for bookmark to reflect these increases in activity.

As described above, the weighting module 222 combines the scores generated by the analyzers 212, 214, 216, 218, 220 for a bookmark to generate an overall score for the bookmark. In one embodiment, the weighting module 222 assigns a weight to each score and combines the scores by computing a weighted sum or product. The weights may be set by an administrator of the social networking system 106 or dynamically adjusted with a machine learning algorithm that uses real-world metrics to calculate scores representing predictions of those metrics. For example, in an embodiment where an overall score is a predicted click-through rate for a corresponding bookmark, the weighting module 222 may measure click-through rates of the bookmarks by social networking system users and refine the weights accordingly. Similarly, in embodiments where an overall score is the likelihood that the user will pay money to an application, the weighting module 222 may refine the weights by measuring the amount of money that the user has already paid to the application. In another embodiment, the weighting module 222 uses a more sophisticated machine learning algorithm to combine the scores from the analyzers into one or more overall scores for each bookmark.

The score processing module 230 includes a ranking module 232, a selection module 234, an ordering module 236, and a business logic module 238. The ranking module 232 generates a ranking for the bookmarks based on the scores 228 calculated by the score generation module 210. In one embodiment, the bookmarks are placed in a list according to their scores, so the bookmark with the highest score is ranked first and the bookmark with the score is ranked last. In other embodiments, the ranking module 232 is omitted, and the selection module 234, the ordering module 236, and the business logic module 238 operate based on the scores 228.

The selection module 234 selects the bookmarks for presentation to the user. In one embodiment, the selection module 234 compares the score for each bookmark to a threshold value, and bookmarks with a score exceeding the threshold value are selected for presentation. In embodiments where the ranking module 232 placed the bookmarks in a list, the selection module 234 identifies the first bookmark in the list having a score that does not exceed a threshold value and selects bookmarks from the list prior to the identified bookmark. As the ranking module 232 ranks the bookmarks based on score, this approach selects bookmarks exceeding the threshold. In embodiments where the bookmarks were not ranked, the selection module 234 compares the score of multiple bookmarks, such as each bookmark, to the threshold. In still other embodiments, the selection module 234 selects bookmarks based on other suitable criteria (e.g., the five bookmarks with the highest scores).

The ordering module 236 determines the order in which the selected bookmarks are presented to the user. In one embodiment, the ordering for the bookmarks is based on the ranking generated by the ranking module 232. In embodiments where a ranking is not generated, the ordering module 236 places the selected bookmarks an ordering based on the scores corresponding to the bookmarks.

The business logic module 238 applies business rules to the bookmarks after they have been scored. As used herein, a business rule is a piece of logic that modifies the selection or ordering of bookmarks independent of the scores 228. For example, a business rule defines a promotion period so that if a non-selected bookmark is accessed (e.g., after accessing the "more" button described above with reference to the bookmark display module 130), then the previously accessed bookmark is selected and displayed for a fixed period of time regardless of its score or ranking.

In one embodiment, the business logic module 238 implements business rules by adjusting the score for a bookmark before the selection module 234 or the ordering module 236 receive the bookmarks. For example, a promotion period is implemented by increasing the score for a bookmark so that its score exceeds the threshold value used by the selection module 234. Business rules may also be implemented by altering the ranking generated by the ranking module 232. Alternatively, a business rule is applied after the bookmarks have been selected and ordered. For example, a promotion period is implemented by simply adding a bookmark satisfying a business rule to a predetermined position within the ordering determined by the ordering module 236.

After the score processing module 230 selects bookmarks to be presented, the selected bookmarks 240 are stored as part of the user profile of the user. In some embodiments, the selected bookmarks are ordered and the ordering is stored along with the selected bookmarks 230 in the user profile of the user. When the user next accesses the social networking system and requests to view the bookmarks, the bookmark display module 130 retrieves the selected bookmarks 240 from the user profile of the user and may use any stored ordering when presenting the selected bookmarks 240.

In one embodiment, the bookmark processing module 128 differently selects and orders bookmarks for a user for different devices. For example, the bookmark processing module 128 receives input data describing interactions that a user performed using a second device and uses a different machine learning model to generate a second set of scores 228. In addition, the selection module 234 and ordering module 236 may optionally use different processes when selecting and ordering bookmarks based on the second set of scores, and the business logic module 238 may enforce a different set of business rules. This is beneficial as a user's usage patterns may differ between devices. For example, if a user frequently interacts with a group on a smart-phone but rarely interacts with the same group on a desktop computer, then a bookmark for the group may be ordered higher if the request to access bookmarks is received from the smart-phone than if the request to access bookmarks is received from the desktop computer.

In one embodiment, the bookmark processing module 128 also processes user requests to manually rearrange bookmarks. A business rule adjusting the scores of one or more bookmarks identified by a user or enforcing a condition to bookmarks identified by the user may be used to implement manual rearrangement of bookmarks. For example, if a user submits a request to have a first bookmark appear above a second bookmark in the ordering, the business logic module may create a business rule increasing the first bookmark's score to exceed the score of the second bookmark. Alternatively, a created business rule may move the first bookmark to a location in the ordering prior to the second bookmark if the ordering module 236 assigned the first bookmark to a location in the ordering after the second bookmark.

The bookmark processing module 128 may also arrange the bookmarks into multiple categories. In one embodiment, bookmarks in multiple of the categories are scored, selected, and ordered together, and the score processing module 230 subsequently sorts the ordered bookmarks into categories. Categories may be defined by object type (e.g., separate categories for applications and groups), by content (e.g., a category for bookmarks related to the President of the United States), or by some other criteria. In one embodiment, the user may choose bookmarks to be included in a favorites category that is displayed in a more prominent position than the other categories (e.g., above the other categories).

In some embodiments, the bookmark processing module 128 also selects and/or orders categories based on the scores 228 of the bookmarks in each category. For example, the bookmark processing module combines the scores 228 of the bookmarks in each category to calculate a category score (e.g., by computing a weighted sum) and performs selection and/or ordering for the categories based on the category scores. Similar to the process for presenting individual bookmarks to the user, the selected categories are subsequently presented to the user in the determined order, and categories that are not selected for presentation can be presented after the user clicks on a "more" button. Additional methods of selecting and ordering categories of bookmarks are described in U.S. patent application Ser. No. 13/330,474, filed on Dec. 19, 2011, which is incorporated by reference herein in its entirety.

In embodiments where the bookmarks are arranged into categories, the business logic module 238 may include business rules specific to a category. For example, a business rule specifies that exactly three bookmarks are always shown in a certain category, or that a certain bookmark is always shown in a category. Similar to the other business rules described above, these category-specific business rules may be implemented by adjusting the scores 228 generated by the score generation module 210 or by modifying the selection and ordering that determined by the selection module 234 and the ordering module 236.

Figure 3:
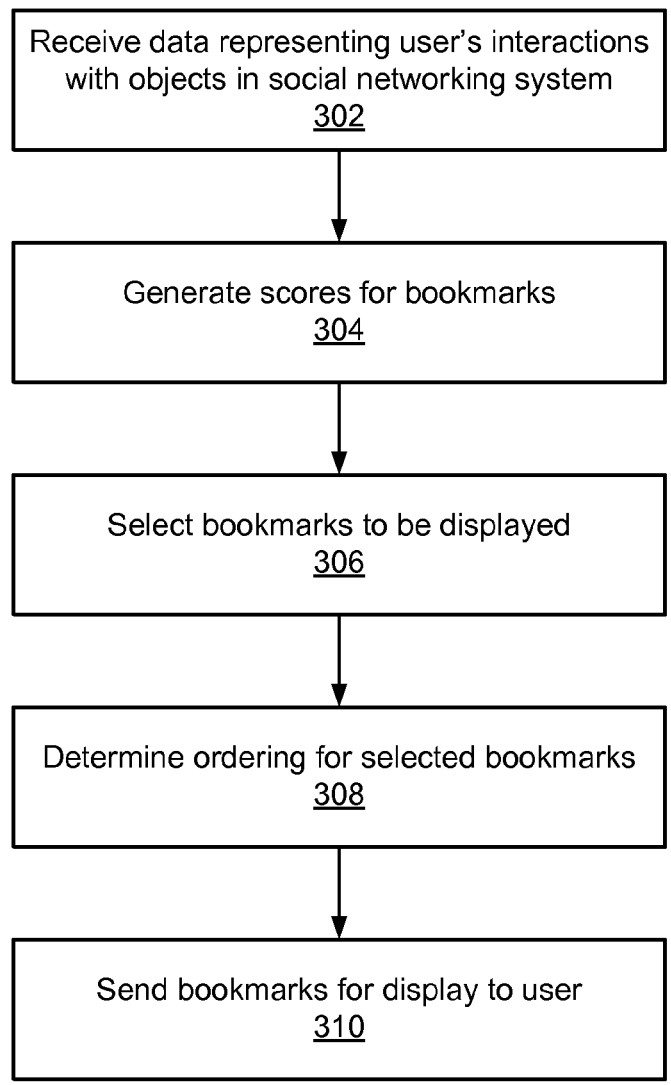
FIG. 3 is a flow chart of a process for selecting and ordering bookmarks in a social networking system, according to one embodiment.

FIG. 3 is a flow chart of one embodiment of a process 300 for selecting and ordering bookmarks in a social networking system 106. The bookmark processing module 128 receives 302 input data 200 with information representing the user's interactions with objects in the social networking system 106 linked to bookmarks stored in the user profile of the user, and analyzes the user interactions using the action analyzer 212 and the time decay analyzer 214, as described above in conjunction with FIG. 2. In some embodiments, the input data 200 may also include information describing the affinity between the user and the objects linked to the bookmarks, connections common to the user and the objects linked to the bookmarks, and notifications associated with the objects linked to the bookmarks, and this information is analyzed by the affinity analyzer 216, the connection analyzer 218, and the notification analyzer 220, as described above with reference to FIG. 2.

Based on the analysis of the input data 200, the score generation module 210 generates 304 a score for each of the bookmarks included in the user profile of the user. In one embodiment, the score for each bookmark is a predicted click-through rate (e.g., with a value between 0 and 1) representing a probability that the user will access a bookmark when the bookmark is presented. In some embodiments, the score generation module 210 includes a machine learning model that measures click-through rates of bookmarks presented to users and modifies the predicted click-through rates based on the measurements.

The scores 228 are used by the selection module 234 to select 306 bookmarks for presentation to the user. In one embodiment, an ordering for the selected bookmarks is determined 208 by the ordering module 236. Selection and ordering of bookmarks is further described above in conjunction with the description of the selection module 234 and the ordering module 236 in conjunction with FIG. 2. In some embodiments, the score processing module 230 selects 306 bookmarks without determining 308 an ordering. In other embodiments, an ordering of the bookmarks may be determined 308 without selecting 306 a subset of the bookmarks for presentation.

After selecting 306 and/or ordering 308 the bookmarks, the selected bookmarks may be stored in the user profile, along with an ordering of the selected bookmarks. The web server 124 sends 310 the selected bookmarks to the user for presentation. In one embodiment, the bookmark display module 130 renders the bookmarks (e.g., as part of a web page) and the web server 124 sends the web page to the user's client device 102. Alternatively, a module on the client device 102 receives the selected bookmarks and performs the rendering.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    storing a plurality of bookmarks associated with a user of a social networking system, each bookmark comprising a link to an object in the social networking system;
    receiving data representing interactions by the user with a plurality of objects in the social networking system to which one or more bookmarks link;
    predicting a click-through rate for each of the plurality of bookmarks based on the received data, each predicted click-through rate representing a probability that the user will access a bookmark when the bookmark is presented to the user;
    selecting one or more of the bookmarks based at least in part on the predicted click-through rates;
    generating an ordered list of the selected bookmarks based at least in part on the predicted click-through rates; and
    sending the ordered list of bookmarks for presentation to the user.

2. The method of claim 1, wherein the received data further comprises information representing an affinity value between the user and one or more of the objects to which a bookmark links.

3. The method of claim 1, wherein the received data further comprises information representing one or more common connections shared by the user and one or more of the objects to which a bookmark links.

4. The method of claim 1, wherein the received data further comprises information representing a number of notifications associated with one or more of the objects to which a bookmark links.

5. The method of claim 1, further comprising:
    receiving, from the user, a request to change the ordering of the bookmarks;
    modifying the ordered list of bookmarks in accordance with the received request to create a modified list of bookmarks; and
    sending the modified list of bookmarks for display to the user.

6. The method of claim 1, further comprising storing the ordered list of bookmarks in a user profile associated with the user.

7. The method of claim 1, wherein sending the ordered list of bookmarks for presentation to the user comprises sending the ordered list of bookmarks to a first client device associated with the user.

8. The method of claim 1, wherein the predicting of the click-through rate uses a connection score that is based on at least partially on a threshold number of other users of the social networking system, the other users being connected to the object linked to the one or more bookmarks and further being connected to the user.

9. The method of claim, 1, wherein the object in a social networking system comprises a node in a graph of the social networking system, the node comprising a display of the user, an content item of the social networking system, the node comprising a display of the user, a content item of the social networking system, a profile of the user, a group of users of the social networking system, an application, a list of content items from users of the social networking on a user profile list, a saved search query by the user, or any combination thereof.

10. The method of claim 1, wherein the received data further representing interactions by users of the social; networking system with the objects linked to the one or more bookmarks.

11. The method of claim 7, further comprising:
    receiving additional information representing interactions by the user with the plurality of objects to which one or more bookmarks link on a second client device;
    predicting a second click-through rate for each of the plurality of bookmarks based on the additional received information;
    selecting one or more of the bookmarks based at least in part on the second predicted click-through rates;
    ordering the selected bookmarks based at least in part on the second predicted click-through rates to create a second list of bookmarks;
    ordering the selected bookmarks based at least in part on the second predicted click-through rates based at least in part on the second predicted click-through rates; and
    sending the second ordered list of bookmarks presentation to the user on the second client device.

12. The method of claim 11, further comprising storing the second ordered list of bookmarks in a user profile associated with the user by the social networking system.

13. A method comprising:
    receiving data comprising information representing interactions by a user with a plurality of objects in a social networking system, each object linked to a bookmark maintained by the social networking system;
    predicting a click-through rate for each of a plurality of bookmarks based on the received data, each predicted click-through rate representing a probability that the user will click on a bookmark based on the interactions by the user with an object linked to the bookmark;
    selecting one or more of the bookmarks based at least in part on the predicted click-through rates; and
    sending the selected bookmarks for presentation to the user.

14. The method of claim 13, wherein the received data further comprises information representing an affinity value between the user and one or more of the objects linked to one or more bookmarks.

15. The method of claim 13, wherein the received data further comprises information representing one or connections shared by the user and one or more of the objects linked to one or more bookmarks.

16. The method of claim 13, wherein the received data further comprises information representing a number of notifications associated with one or more of the objects linked to one or more bookmarks.

17. The method of claim 13, wherein sending the selected bookmarks for presentation to the user comprises sending the selected bookmarks to a first client device.

18. The method of claim 17, further comprising:
receiving additional information representing interactions by the user with the plurality of objects linked to one or more bookmarks on a second client device;
predicting a second click-through rate for each of the plurality of bookmarks based on the additional received information;
selecting one or more of the bookmarks based at least in part on the second predicted click-through rates; and
sending the selected bookmarks based at least in part on the second predicated click-through rates for display to the user on the second client device.

19. The method of claim 18, further comprising storing the selected bookmarks in a user profile associated with the user by the social networking system.

20. A method comprising:
receiving data comprising information representing interactions by a user with a plurality of objects in a social networking system, each object linked to a bookmark maintained by the social networking system;
predicting a score for each of a plurality of bookmarks associated with the user based on the received data, each score representing a probability that the user will access a bookmark;
selecting one or more of the bookmarks based at least in part on the predicted score;
generating a ordered listing of the selected bookmarks, the selected bookmarks ordered based at least in part on the predicted scores associated with each bookmark; and
sending the ordered list of bookmarks for presentation to the user.

21. The method of claim 20, wherein the received data further comprises information representing an affinity value between the user and one or more of the objects linked to one or more bookmarks.

22. The method of claim 20, wherein the received data further comprises information representing one or more connections shared by the user and one or more of the objects linked to one or more bookmarks.

23. The method of claim 20, wherein the received data further comprises information representing a number of notifications associated with one or more of the objects linked to one or more bookmarks.

24. The method of claim 20, wherein sending the ordered list of bookmarks for presentation to the user comprises sending the ordered list of bookmarks to a first client device.

* * * * *

UNITED STATES PATENT AND TRADEMARK OFFICE
CERTIFICATE OF CORRECTION

PATENT NO. : 9,171,287 B2
APPLICATION NO. : 13/720724
DATED : October 27, 2015
INVENTOR(S) : Sorg et al.

Page 1 of 1

It is certified that error appears in the above-identified patent and that said Letters Patent is hereby corrected as shown below:

In the Claims:
Column 13, lines 66-67, claim 8, replace "click-through rate uses a connection score that is based on at least partially on a threshold number of other users of the," with --click-through rate uses a connection score that is based at least partially on a threshold number of other users of the--.
Column 14, line 4, claim 9, replace "The method of claim, 1, wherein the object in a social," with --The method of claim 1, wherein the object in a social--.
Column 14, line 8, claim 9, replace "an content item of the social networking system, the node," with --a content item of the social networking system, the node--.
Column 14, line 15, claim 10, replace "further representing interactions by users of the social; net-," with --further representing interactions by users of the social net- --.

Signed and Sealed this
Twenty-sixth Day of July, 2016

Michelle K. Lee
*Director of the United States Patent and Trademark Office*